Chas. F. Whorf

Warm Air Furnace

75097

PATENTED
MAR 3 1868

Witnesses:
Thomas Curridge
Chas. H. Boyle

Inventor:
C. F. Whorf
By his Atty
W. Randolph & Co

UNITED STATES PATENT OFFICE.

CHARLES F. WHORF, OF ST. LOUIS, MISSOURI, ASSIGNOR TO HIMSELF AND CHARLES M. ELLEARD, OF SAME PLACE.

IMPROVEMENT IN HOT-AIR FURNACES.

Specification forming part of Letters Patent No. 75,097, dated March 3, 1868.

*To all whom it may concern:*

Be it known that I, CHARLES F. WHORF, of the city and county of St. Louis, and State of Missouri, have invented a new and useful Improvement in Warming and Ventilating Furnaces; and I do hereby declare that the following is a full and clear description thereof, reference being had to the accompanying drawings, and to the letters of reference marked thereon.

The object of this invention is to prepare a large volume of air, as well with regard to its hygrometric qualities as to its temperature, and to distribute it to rooms of buildings, for the purpose of warming and ventilating them. The apparatus for doing this consists of a fire-box, (such as is used in any kind of heating-furnace may be employed for this,) the said fire-box being surrounded by a series of vertical tubes, so as to leave an annular chamber between the said fire-box and the said tubes. Cold air is introduced into the bottom of the said annular chamber, and also into the bottoms of the tubes. That in the chamber is heated to a high degree by direct contact with the furnace, and that in the tubes by the warmth imparted to them by the surrounding hot air. Thus is utilized that caloric which is usually absorbed by the side walls of a furnace. A mixing and distributing chamber is placed above the furnace, into which both the highly-heated air from the annular chamber and the mildly-heated air from the tubes is conducted, and from thence distributed. A vessel of water placed in the mixing-chamber imparts to the air the requisite humidity to render it fit for respiration.

To enable those skilled in the art to make and use my improved furnace, I will proceed to describe its construction and operation.

Figure 1:
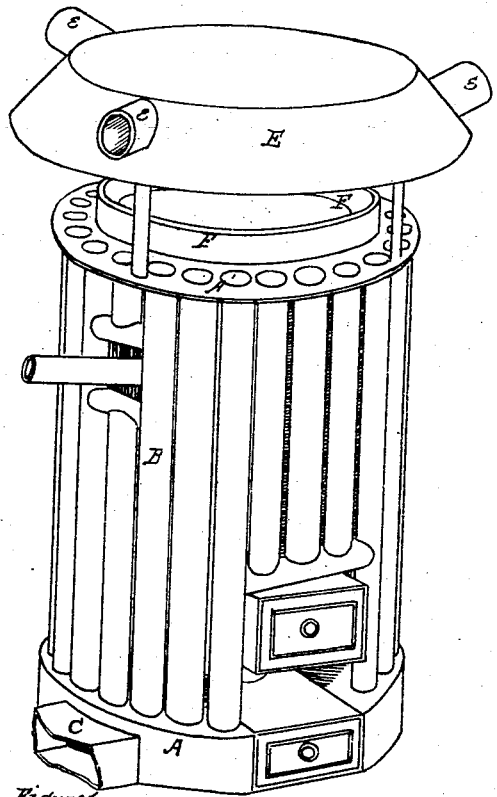
Figure 2:
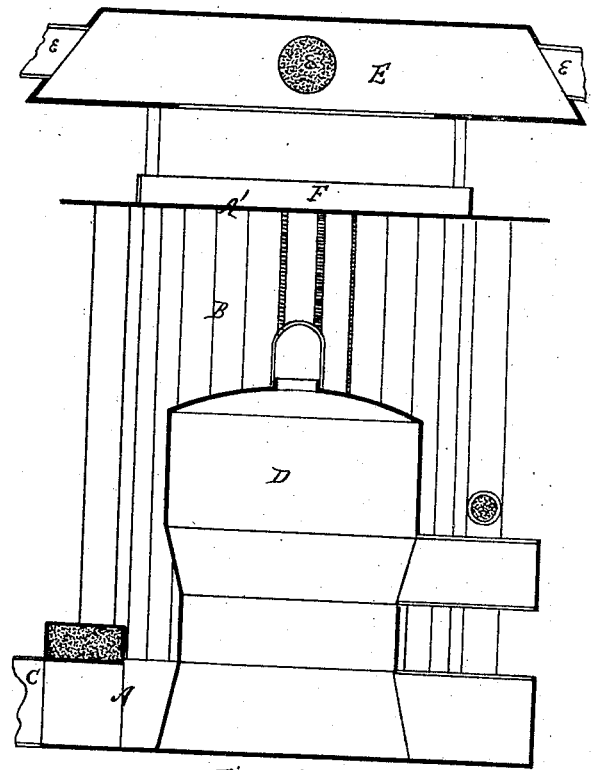
Figure 3:
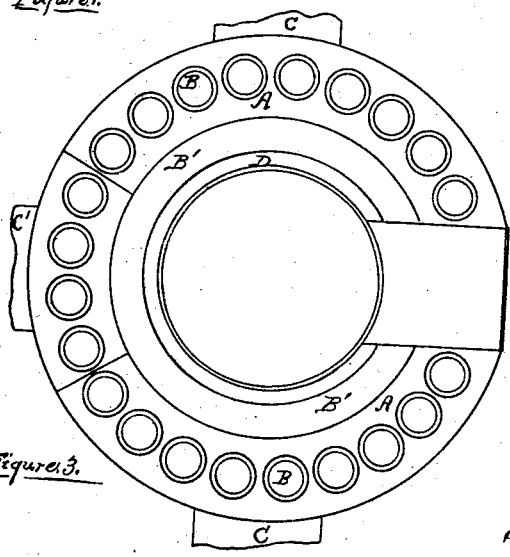

Figure 1 of the drawings is an elevation, in perspective, of the improved furnace. Fig. 2 is a sectional plan of the same; and Fig. 3 is a vertical central sectional elevation of it.

A is an annular cold-air chamber, surrounding the base of the fire-box; or, in lieu of the annular form, two crescent chambers may be used. Vertical tubes B connect the chamber A with the top plate A', so as to form an annular chamber, B', (shown in Fig. 2,) between the furnace and the tubes B. The cold-air pipes C supply fresh air to the chamber A, and the pipe C' to the chamber B'. The air which presses up in the chamber B' comes in direct contact with the sides of the furnace D, and thereby becomes heated to a high degree, and the air so heated imparts a considerable degree of warmth to the tubes B, and by this means the air in them is mildly heated. This arrangement affords a very great economy of fuel, as the heat imparted to the tubes and the air within them would otherwise be absorbed by the sides of the furnace and lost, except so far as its radiation would elevate the temperature of air in the chamber B'. The heated air in the chamber B' rises through the apertures between the pipes B into an open chamber between the plate A' and the distributing-chamber E, and the pipes B also discharge their heated air in the same place, and thus the two volumes become mixed in one, and pass into the distributing-chamber in one common mass of mildly-heated air. From the chamber E the pipes *e* convey the air to the apartment where it will be required for use. A vessel, F, situated above the plate A', and kept constantly filled with water, will impart the requisite humidity to the atmosphere to fit it for respiration, and in this prepared condition it will reach the lungs of the consumer.

I am aware that water-vessels of this character have been used for like purposes before, in connection with hot-air furnaces; but I claim the arrangement of the said vessel, in the combination herein shown and described, to be new.

Having described my invention, what I claim is—

1. The distributing-chamber E, the water-vessel F, and the furnace A A' B, when combined and arranged as described and set forth.

2. In combination with the above, the series of pipes B, the annular heating-chamber B', and the pipes C and C', as and for the purpose set forth.

CHARLES F. WHORF.

Witnesses:
M. RANDOLPH,
CHAS. H. BOYLE.